United States Patent
Ratnapu et al.

(10) Patent No.: US 12,373,790 B2
(45) Date of Patent: Jul. 29, 2025

(54) CATEGORY CLASSIFICATION OF RECORDS OF E-PROCUREMENT TRANSACTIONS

(71) Applicant: COUPA SOFTWARE INCORPORATED, San Mateo, CA (US)

(72) Inventors: Kiran Ratnapu, Santa Clara, CA (US); Ankit Narang, Pune (IN); Hari Teja Murakonda, Dublin, CA (US); Yutaka Hosoai, Costa Mesa, CA (US); Brent Sisson, Castro Valley, CA (US)

(73) Assignee: Coupa Software Incorporated, Foster City, CA (US)

( * ) Notice: Subject to any disclaimer, the term of this patent is extended or adjusted under 35 U.S.C. 154(b) by 184 days.

(21) Appl. No.: 18/190,591

(22) Filed: Mar. 27, 2023

(65) Prior Publication Data

US 2023/0351327 A1 Nov. 2, 2023

Related U.S. Application Data

(60) Provisional application No. 63/336,636, filed on Apr. 29, 2022.

(51) Int. Cl.
G06Q 10/0875 (2023.01)
(52) U.S. Cl.
CPC ............................... *G06Q 10/0875* (2013.01)
(58) Field of Classification Search
CPC .................................................. G06Q 10/0875
See application file for complete search history.

(56) References Cited

U.S. PATENT DOCUMENTS

| | | | |
|---|---|---|---|
| 7,966,329 B1* | 6/2011 | Rukonic | G06Q 40/02 707/950 |
| 2020/0279219 A1* | 9/2020 | Desai | G06F 16/355 |
| 2020/0387828 A1 | 12/2020 | Meehan et al. | |
| 2021/0241072 A1 | 8/2021 | Katzenelson et al. | |
| 2021/0287261 A1 | 9/2021 | Medalion et al. | |

(Continued)

FOREIGN PATENT DOCUMENTS

CN 11178859 A 10/2020

OTHER PUBLICATIONS

Melanie F Pradier, "Preferential Mixture-of-Experts: Interpretable Models that Rely on Human Expertise As Much As Possible", 2021, https://pmc.ncbi.nlm.nih.gov/articles/PMC8378634/ (Year: 2021).*

(Continued)

*Primary Examiner* — Allen C Chein
(74) *Attorney, Agent, or Firm* — Baker Botts L.L.P.

(57) ABSTRACT

Commodity category values can be determined automatically for suppliers in an e-procurement system using a computer-implemented process that is supplier-focused and uses successive heuristics, supplemented with machine learning models that predict category and subcategory values based on supplier names and invoice descriptions. Embodiments can support community intelligence applications to enable buyer computers to query and obtain lists of suppliers corresponding to categories and to generate graphs or charts that aggregate historic invoice data based on canonical category values that have been determined for suppliers.

22 Claims, 7 Drawing Sheets

(56) References Cited

U.S. PATENT DOCUMENTS

2022/0067714 A1* 3/2022 Young .................. G06N 20/00
2023/0153740 A1 5/2023 Meehan et al.

OTHER PUBLICATIONS

Gavin Kerrigan, "Combining Human Predictions with Model Probabilities via Confusion Matrices and Calibration", 2021, https://proceedings.neurips.cc/paper_files/paper/2021/file/234b941e88b755b7a72a1c1dd5022f30-Paper.pdf (Year: 2021).*
Jason Brownlee, "A Gentle Introduction to Mixture of Experts Ensembles", Nov. 7, 2021, https://machinelearningmastery.com/mixture-of-experts/ (Year: 2021).*

* cited by examiner

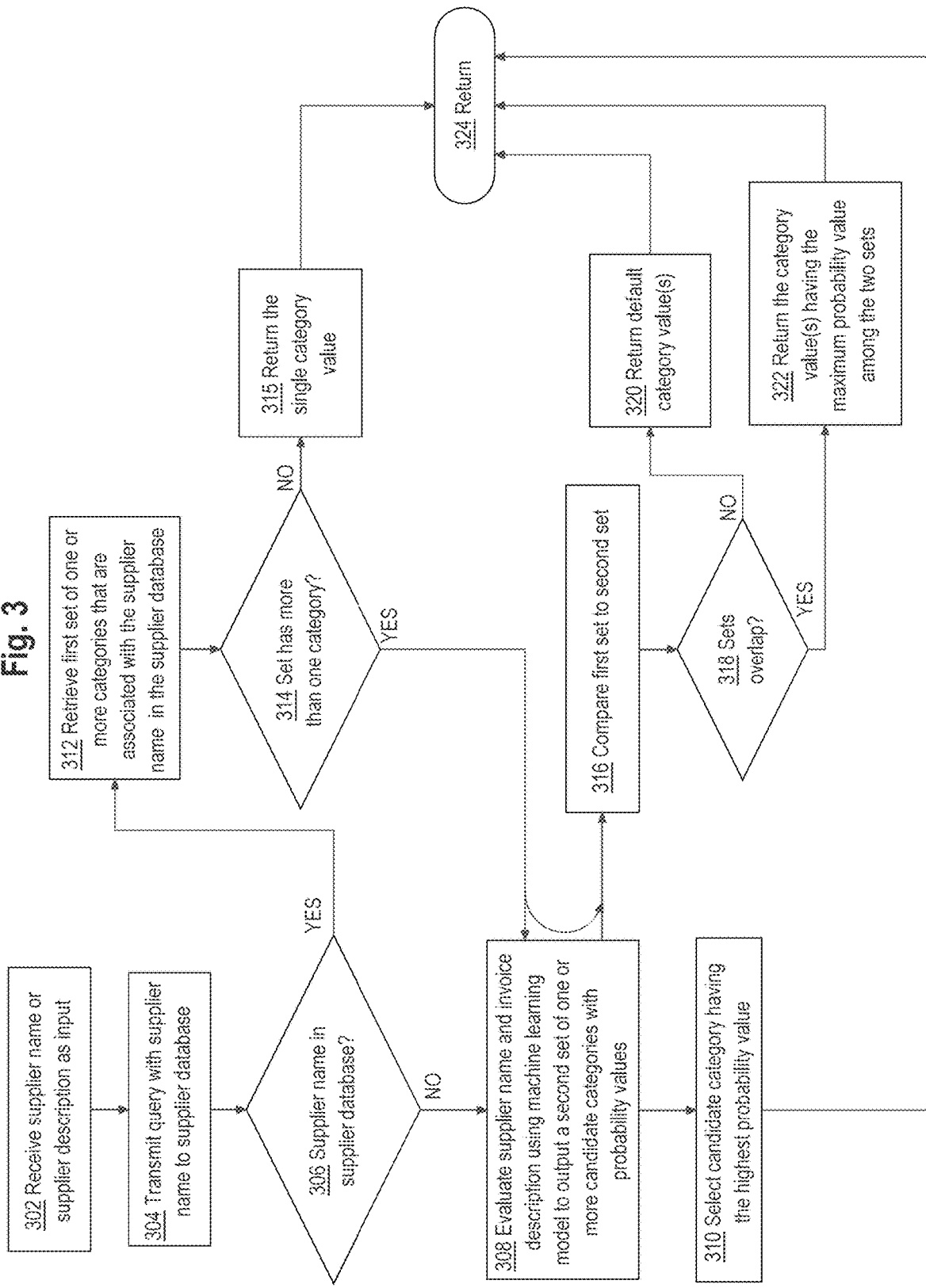

CATEGORY CLASSIFICATION OF RECORDS OF E-PROCUREMENT TRANSACTIONS

BENEFIT CLAIM

This application claims the benefit under 35 U.S.C. § 119(e) of provisional application 63/336,636, filed Apr. 29, 2022, the entire contents of which are hereby incorporated by reference for all purposes as if fully set forth herein. Applicant hereby rescinds any disclaimer of claim scope that may have occurred in the priority application(s) and advises the PTO that the claims in this application may be broader than in any priority application(s).

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever.© 2021-2022 Coupa Software Incorporated.

TECHNICAL FIELD

One technical field of the present disclosure is relational database systems, including automated transformations of database records.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Large-scale database systems are presently used to create, read, update, and delete records representing transactions for the purchase of goods and services. Sophisticated online software platforms now are available to enable buyer computers to create electronic requisitions or purchase orders for commodities, directed to supplier computers of entities that can deliver the commodities according to an agreed price and schedule. However, these systems have not efficiently or effectively solved the problem of how to correlate a transaction relating to a commodity when that commodity is identified using a different description or different supplier name in two different documents, even though the commodity and supplier were the same. For example, if a first procurement document identifies a commodity as "GLOVE NITRILE HEAT RESISTANT 12-COUNT BOX" with the supplier name "ACME SERVICE PROD CO", whereas a second procurement document identifies the identical commodity as "GLOVE NIT HR 12-CT BX" from "ACME SP CO", the software platform may be unable to recognize that the underlying commodity is the same.

In one approach, starting with a record of a transaction such as an invoice, a supplier name and invoice description are extracted. The name of the supplier is evaluated using a first machine learning model to output a prediction of a primary category, and is evaluated using a second machine learning model to output a prediction of a subcategory. The same process is used to predict a category and subcategory of an invoice description. While this process works, it has a significant dependency upon having a large training dataset that is representative of all transactions and accurately labeled.

For example, in large-scale, multi-enterprise e-procurement systems, system storage devices might store transaction records on the order of 100 million transactions consisting of requisitions, purchase orders, invoices, and other electronic documents relating to e-procurement transactions. To evaluate a dataset of that size using typical machine learning models, training data for about 10 million transactions could be required, representing requisitions for punchout suppliers and/or records of actual consumption by entities. To be effective, the training dataset must be representative of all the data, and ensuring an unbiased dataset is difficult. Further, preparing a labeled training dataset of that size is not practical, so alternatives are needed.

Moreover, in this approach, the name of the supplier and the description value typically are weighted equally. Experimentation has shown this assumption to be in accurate because the invoice description value tends to dominate a final prediction. For example, "gloves" that were ordered from a medical products supplier should be categorized as "medical supplies" and not as "apparel".

Improved approaches are needed to account for the foregoing drawbacks. Accurately and efficiently determining a UNSPSC code or application-specific category value for an item, based on a free-form description value and supplier information, is believed to be the key to unlocking the potential of community intelligence in a variety of e-procurement applications that need canonical commodity classifications, including but not limited to invoicing, contract management, automated sourcing events, and recommendations of suppliers.

SUMMARY

The appended claims may serve as a summary of the invention.

BRIEF DESCRIPTION OF THE DRAWINGS

In the drawings:

FIG. 3 illustrates an example process for determining a supplier category, in one embodiment.

DETAILED DESCRIPTION

Figure 1A:
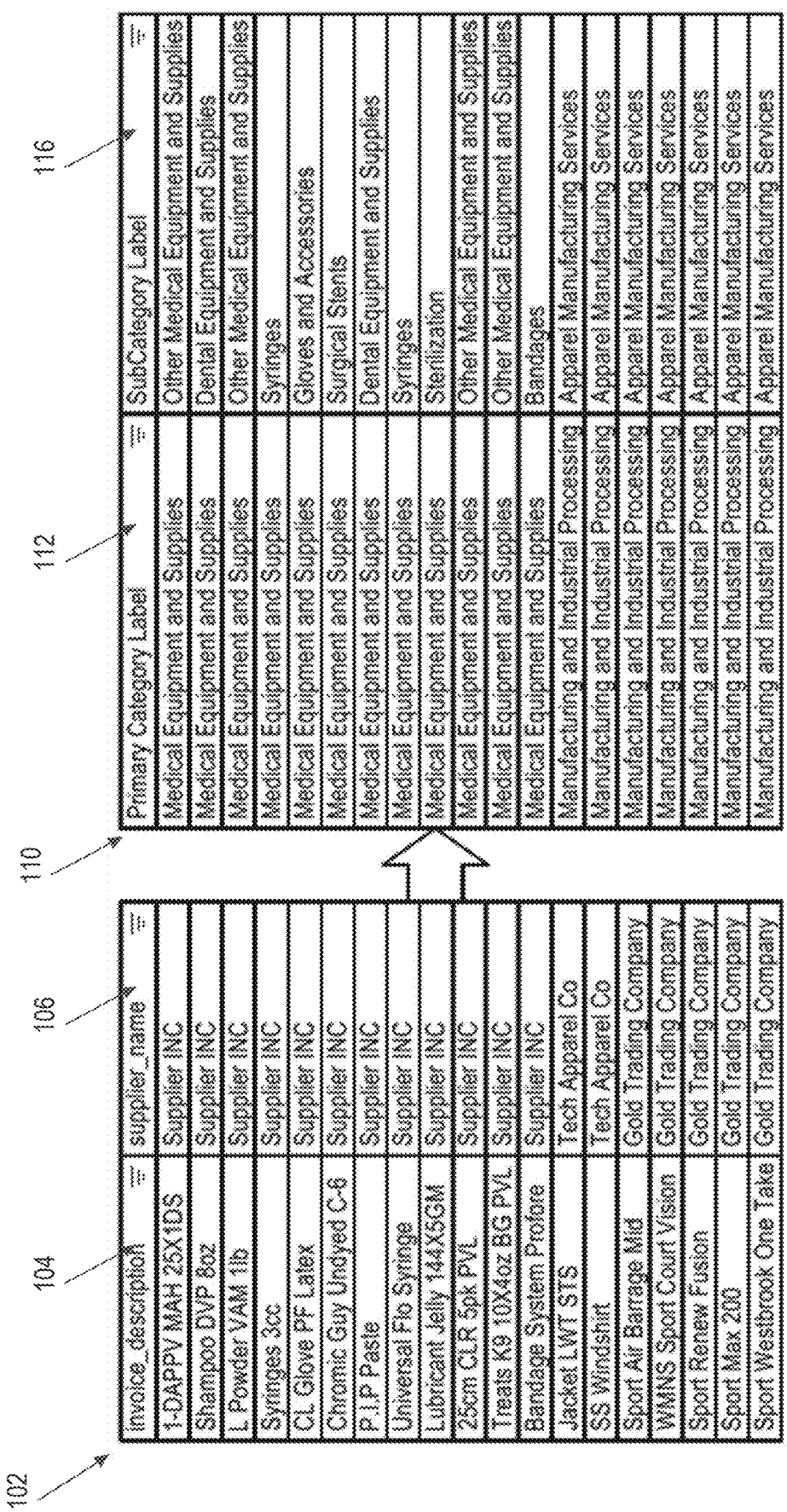
FIG. 1A illustrates tables of invoice line descriptions and supplier names with mappings to primary category labels and subcategory labels.

In the following description, for the purposes of explanation, numerous specific details are set forth to provide a thorough understanding of the present invention. It will be apparent, however, that the present invention may be practiced without these specific details. In other instances, well-known structures and devices are shown in block diagram form to avoid unnecessarily obscuring the present invention.

The text of this disclosure, in combination with the drawing figures, is intended to state in prose the algorithms that are necessary to program the computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

1. General Overview

Embodiments address the technical problem of how to classify digitally stored records of transactions into categories based on a description and supplier name in each of the records. A category, in this context, can be a UNSPSC category, or a category that is defined in a taxonomy that is specific to a particular e-procurement platform. Accurate categorization of the commodities that are identified in invoices is an important foundation for other practical applications of data processing. For example, with accurate categorization, other programs can find similarities among transactions that different entities have completed, enabling the programs to make recommendations for different entities to participate in sourcing events for the same commodity or other related commodities. Accurate categorization also enables linking transactions to existing contracts, supports accurate inventory management, and enables automatic machine recommendations for transactions, possibly with lower prices, within the same categories based upon records of other similar transactions by different entities that participate in a federated, multi-tenant e-procurement system.

FIG. 1A illustrates tables of invoice line descriptions and supplier names with mappings to primary category labels and subcategory labels. In the example of FIG. 1A, an invoice database 102 stores invoice line-item detail, and a second table 111 stores category labels that are mapped to corresponding items in the first table. In an electronic document of an e-procurement system such as an invoice, each invoice line item has a description 104 and specifies a supplier name 106. Description 104 often is a free-form text field so its content is unstructured and can vary across buyer entities. A primary category label 112 is a broad type of commodity for the specified description, and the subcategory label 116 provides a finer categorization of the commodity. The challenge to an embodiment is how to accurately map a description 104 and supplier name 106, in a line item, to a primary category label 112 and subcategory label 116. The values of a primary category label 112 and subcategory label 116 of FIG. 1A are examples of values in a private taxonomy.

Embodiments can be used in large-scale, multi-enterprise e-procurement systems. For example, the inventors configured one implementation to process over 100 million transactions consisting of requisitions, purchase orders, invoices, and other electronic documents relating to e-procurement transactions. In certain machine learning models, training data represented about 10 million transactions representing requisitions for punchout suppliers and/or records of actual consumption by entities.

In developing solutions, the inventors discovered, in an inventive moment, that implementing certain constraints in evaluating the data could lead to an effective and efficient approach. For example, classification can address a supplier, alone, in a first pass, and address description values only if the supplier deals in many products. If the supplier trades in commodities that are limited to a single category, then classifying the supplier alone can be sufficient to classify a line item of a document. In one analysis of actual transaction data, the inventors discovered that 92.9% of the suppliers of an enterprise could be associated with a single primary category, 5.9% offered commodities in two primary categories, and only about 1.2% of suppliers traded in three or more categories of commodities.

Furthermore, the conventional need for extensive training data representing millions of suppliers could be reduced if a particular enterprise trades with a few suppliers that contribute heavily toward total enterprise spending. In another analysis of enterprise procurement data, the inventors discovered that among a total of 1.638 million suppliers trading with many entities in a community of users of an e-procurement platform, about 50,000 suppliers represented about 85% of total community spending. Thus, most of the enterprise spending is concentrated among a few suppliers.

To solve the problems of the Background, commodity classification is executed using a tiered, supplier-driven approach. Embodiments provide the practical application of building and populating records of a supplier database based upon machine learning models with an optional manual review of specified suppliers, assigning categories of commodities that a supplier supplies, and constraining the commodity classification models to predict categories only in supplier categories. Commodity classification in this manner can serve as a foundation for numerous applications of anonymized supplier data, spending data, and other community intelligence. Example applications include outputting supplier information based on a query specifying a commodity in which results are driven by supplier category values, and outputting anonymized community spending data for a plurality of categories of suppliers. These applications can be integrated with category values that are generated using an improvement in predictive accuracy via new technical means as further described in the disclosure.

Commodity category values can be determined automatically for suppliers in an e-procurement system using a computer-implemented process that is supplier-focused and uses successive heuristics, supplemented with machine learning models that predict category and subcategory values based on supplier names and invoice descriptions. Embodiments can support community intelligence applications to enable buyer computers to query and obtain lists of suppliers corresponding to categories and to generate graphs or charts that aggregate historic invoice data based on canonical category values that have been determined for suppliers.

In one embodiment, customer commodity values, supplier description values, and invoice descriptions from historic invoices are provided as input to machine learning models, which evaluate the data and generate output predictions of category values and subcategory values. The category values for selected high-spend suppliers can be manually curated to improve accuracy, and resulting category values can populate a supplier database.

In another embodiment, a supplier name is used in a query to a supplier database to retrieve a result set of one or more category values. If the result set has only one category value, the process returns that category value as output. If the result set has multiple category values, then the process evaluates the supplier name and invoice description values using machine learning models to generate predictions of category values, then returns the category value having a maximum probability in the category set. If there is no overlap between the predictions and the set of one or more category values that were obtained from the supplier database, then a default category value is returned. If the supplier does not exist in the supplier database, then the process can return the highest probability category value according to the machine learning models.

Various embodiments encompass the subject matter of the following enumerated clauses:

1. A computer-implemented method, comprising: using an application server computer in a federated, multi-tenant e-procurement system having a plurality of hosted applications, receiving input comprising a supplier name or supplier description associated with a row in a supplier database, the row representing a digitally stored electronic invoice, the supplier database being a relational database; using the application server, transmitting a query including the supplier name to a supplier database, receiving a result set from the supplier database, and determining from the result set whether the supplier name is in the supplier database; in response to determining that the supplier name is in the supplier database, retrieving a first set of one or more categories that are associated with the supplier name in the supplier database, the first set of one or more categories having been assigned based on a customer commodities data of a taxonomy database; first, in response to determining that the first set comprises one category value, populating a primary category attribute of the row using the one category value; thereafter, in response to determining that the first set comprises more than one category, obtaining an invoice description value and evaluating the supplier name and the invoice description value using at least two trained machine learning models to output a prediction of a second set of two or more candidate categories with probability values specifying probabilities that each of the two or more candidate categories is correct; selecting two particular candidate category values having the two highest probability values; populating the primary category attribute and a secondary category attribute of the row using two particular candidate category values having the highest probability values.

2. The method of clause 1, each of the one or more trained machine learning models comprising any of: an ensemble of a naïve Bayes classifier, a feature extraction vectorizer, a logistic regression model or linear classifier; a transformer-based sentence extraction model.

3. The method of clause 1, further comprising: comparing the first set to the second set; when the first set and the second set overlap, returning a category value having the maximum probability value among the first set and the second set as an output of a primary category.

4. The method of clause 3, further comprising, when the first set and the second set overlap, returning a first category value having the maximum probability value among the first set and the second set as an output of a primary category and returning a second category value having the second-highest probability value among the first set and the second set as an output of a secondary category.

5. The method of clause 3, further comprising, when the first set and the second set do not overlap, returning a default category value as the output of the primary category.

6. The method of clause 1, further comprising training one or more trained machine learning models using a first dataset specifying customer commodities, a second dataset comprising supplier descriptions, and a third dataset specifying a set of invoice descriptions.

7. The method of clause 1, the first set of one or more categories and the second set of one or more candidate categories each specifying a UNSPSC category value.

8. The method of clause 1, the invoice description value being obtained from a free-form text field of the database.

9. The method of clause 1, the input comprising an invoice line-item detail table that comprises invoice descriptions and supplier names corresponding to a plurality of invoice records for electronic invoices.

10. The method of clause 1, wherein receiving the input comprises a buyer computer entering a supplier name in a supplier name field of an application to retrieve other information about the supplier, the method further comprising invoking a micro-service or function programmed to execute the transmitting, determining, selecting, and populating.

11. The method of clause 1, wherein the first determining that the first set comprises one category value further comprises reading a default category value of the row.

2. Structural & Functional Overview 2.1 Example Distributed Computer System

Figure 1B:
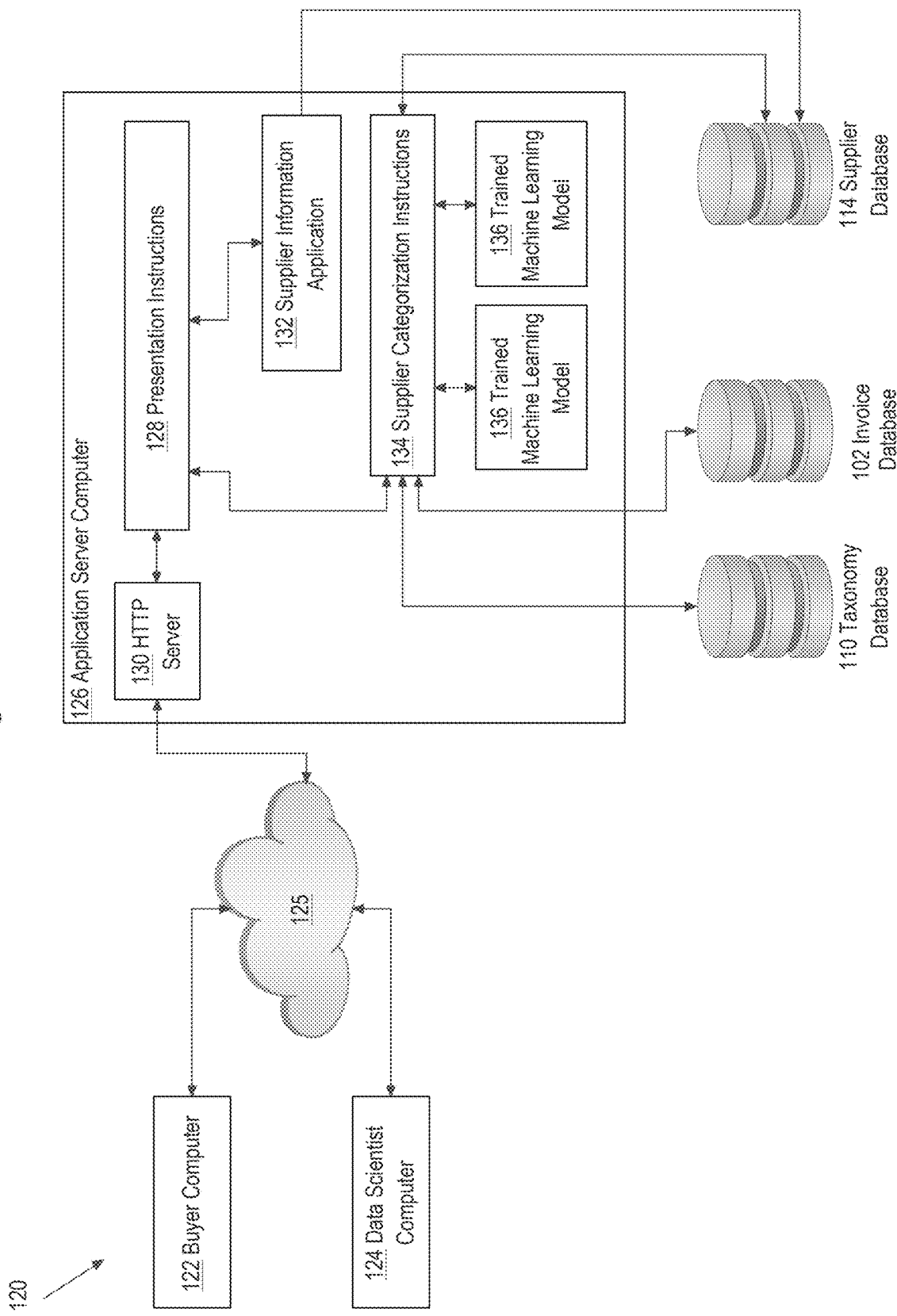
FIG. 1B illustrates a distributed computer system showing the context of use and principal functional elements with which one embodiment could be implemented.

FIG. 1B illustrates a distributed computer system showing the context of use and principal functional elements with which one embodiment could be implemented. In an embodiment, a computer system 120 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1B illustrates only one of many possible arrangements of components configured to execute the programming described herein. Other arrangements may include fewer or different components, and the division of work between the components may vary depending on the arrangement.

FIG. 1B, and the other drawing figures and all the description and claims in this disclosure, are intended to present, disclose and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous. For example, throughout the disclosure, the term "category" refers to a digitally stored data item representing a label or value of a category, and not to an abstract concept of category.

In an embodiment, at least one buyer computer 122 and at least one data scientist computer 124 are communicatively coupled directly or indirectly via one or more networks 125 to an application server computer 126. The buyer computer 122 can be associated with an entity or enterprise having a relationship of a buyer to one or more suppliers. Any number of buyer computers, entities, and enterprises can be supported in an embodiment, and practical applications include thousands to millions of buyer computers 122. The data scientist computer 124 typically is associated with an administrative user of application server computer 126 and provides input to manually label certain training dataset in the manner described in other sections. Each of the buyer computer 122 and data scientist computer 124 can comprise a laptop computer, desktop computer, mobile computing device, workstation, or network computer.

Network 125 broadly represents any combination of one or more local area networks, wide area networks, campus networks, or internetworks that interoperate using network communication protocols, or a stack of protocols, such as IP, TCP, HTTP, and optionally application-level protocols, using any of terrestrial or satellite, wired or wireless network communication links.

The application server computer 126 can be implemented using one or more server computers, server clusters, processor clusters, and/or virtual machine instances, in any physical or logical location including but not limited to an office, server room, private data center, public datacenter or cloud computing facility. The application server computer 126 can form part of a federated, multi-tenant e-procurement system having a plurality of hosted applications or solutions for a plurality of different customers or tenants, each having secure data storage in one or more databases such as taxonomy database 110, invoice database 102, and supplier database 114. The databases and application server computer 126 can implement access controls and security software to support multi-tenancy in which a buyer computer 122 that is associated with a first customer or entity has exclusive access to taxonomy data, invoices, and other e-procurement transaction data that is associated with the same first customer or entity, and no access to similar data that is associated with a different customer or entity. In this manner, even competitors can concurrently store data in the databases while access controls block access of one tenant to the data of another tenant.

The taxonomy database 110 can be configured with a table schema to store a global taxonomy of commodity categories, a customer-specific taxonomy of commodity categories, or both. In one embodiment, customer commodities data is digitally stored in the taxonomy database 110, which is programmed using a relational database table schema to support a different taxonomy of supplier categories for each of a plurality of different customers or tenants. In some embodiments, each enterprise or customer that uses an instance of the application server computer 126 can use an administrative interface to create and digitally store an instance-specific, enterprise-specific, or customer-specific taxonomy of commodity categories, using category labels specific to that entity. Using application software, buyer computer 122 can connect to the taxonomy database 110 and assign a commodity value or category value to each transaction that the buyer entity processes in the system, if desired. Commodity values in the taxonomy database 110 often will be different than or broader than any description of goods in a particular invoice. In some embodiments, community intelligence applications or other software programs of the application server computer 126 are programmed to read the customer-specific taxonomies of a plurality of different entities, enterprises, customers, or instances and to create and digitally store a global taxonomy of categories. For example, normalization techniques can be programmed to detect multiple similar categories in multiple different customer-specific taxonomies that relate to the same commodity to define a single commodity category for them in the global taxonomy. The details of programming to generate a global taxonomy are beyond the scope of this disclosure and parties implementing the present disclosure are presumed to be familiar with normalization techniques and other means of creating a global dataset from a plurality of entity-specific datasets that may use different labels to refer to the same data item.

In one embodiment, invoice database 102 is a relational database programmed using a table schema that records requisitions, purchase orders, invoices, and other electronic digital documents relating to transactions between the buyer computer 122 and one or more supplier computers. Invoice database 102 may be a large-scale data storage device, cluster, or other networked data storage capable of storing on the order of 100 million records for multiple entities. Supplier database 114 can be a relational database programmed with a table schema in which each row of at least one table is associated with a supplier, and columns of the table store attributes of suppliers such as names, tax identification numbers, addresses, primary commodity categories, and secondary or subcategories. In an embodiment, supplier database 114 provides an authoritative repository of supplier data and includes for each supplier at least a canonical name of the supplier to provide consistency across a plurality of applications that use supplier data.

In an embodiment, application server computer 126 is programmed with an HTTP server 130, presentation instructions 128, optionally a supplier information application 132, supplier categorization instructions 134, and one or more trained machine learning models for which two trained machine learning models 136, 138 are shown as an example. In an embodiment, HTTP server 130 provides an application-level interface using HTTP and HTML of the buyer computer 122 and data scientist computer 124 to the application server computer 126 and applications hosted in it. The HTTP server 130 can interoperate with compatible browser applications at the buyer computer 122 and data scientist computer 124 to transmit HTTP responses having dynamically generated HTML payloads for rendering at the browsers, and to receive HTTP POST or GET requests from the buyer computer or data scientist computer for parsing and programmatic transmittal to the presentation instructions 128, supplier information application 132 and/or supplier categorization instructions 134. The presentation instructions 128 can be programmed to receive programmatic requests from the supplier information application 132 and/or supplier categorization instructions 134 to output specified data, and to format the data in dynamically generated HTML payloads that are delivered via HTTP server 130 to the buyer's computer 122 and data scientist computer 124. In this manner, one or more of the supplier information applications 132 and/or supplier categorization instructions 134 can implement SaaS-based applications for which the buyer computer 122 and data scientist computer 124 need only support a browser for interoperation. Alternatively, the buyer computer 122 and data scientist computer 124 can download and use compatible mobile applications or apps that interoperate via app-specific protocols, parameterized HTTP, and/or API calls with the supplier information application 132 and/or supplier categorization instructions 134.

Supplier information application 132 can be programmed to implement one or more e-procurement applications, individually or integrated into a federated system of applications. Example applications include supplier information management, supplier query and retrieval, community-based supplier investigation, invoicing, sourcing events, payments, and procurement. The specific application is not critical, and some implementations can omit supplier information application 132.

Figure 2A:
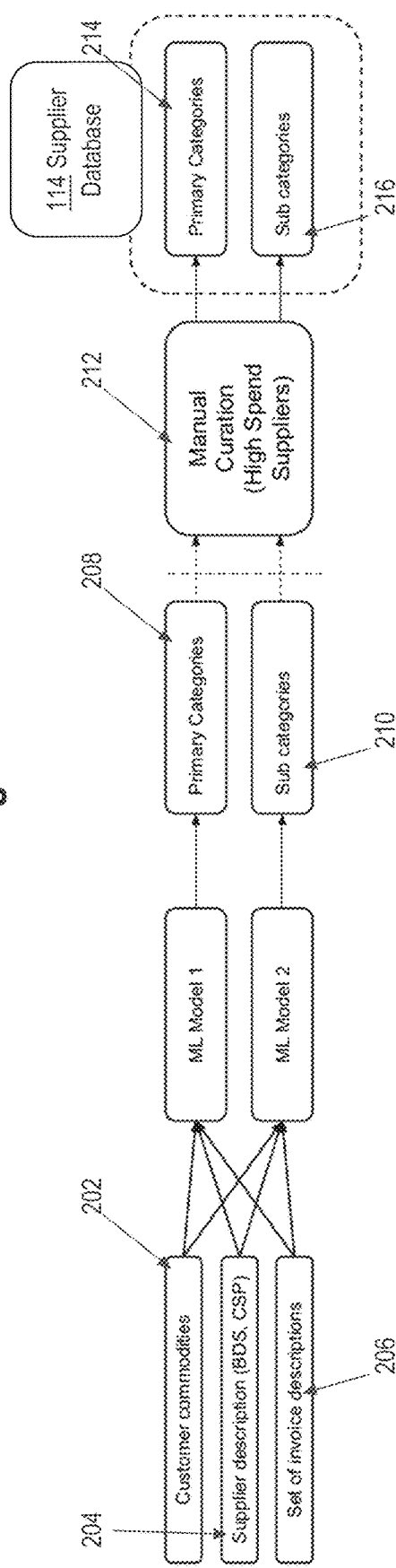
FIG. 2A is a data flow diagram showing tiered machine learning processing of e-procurement records to result in efficient, accurate categorization of suppliers.
Figure 2B:
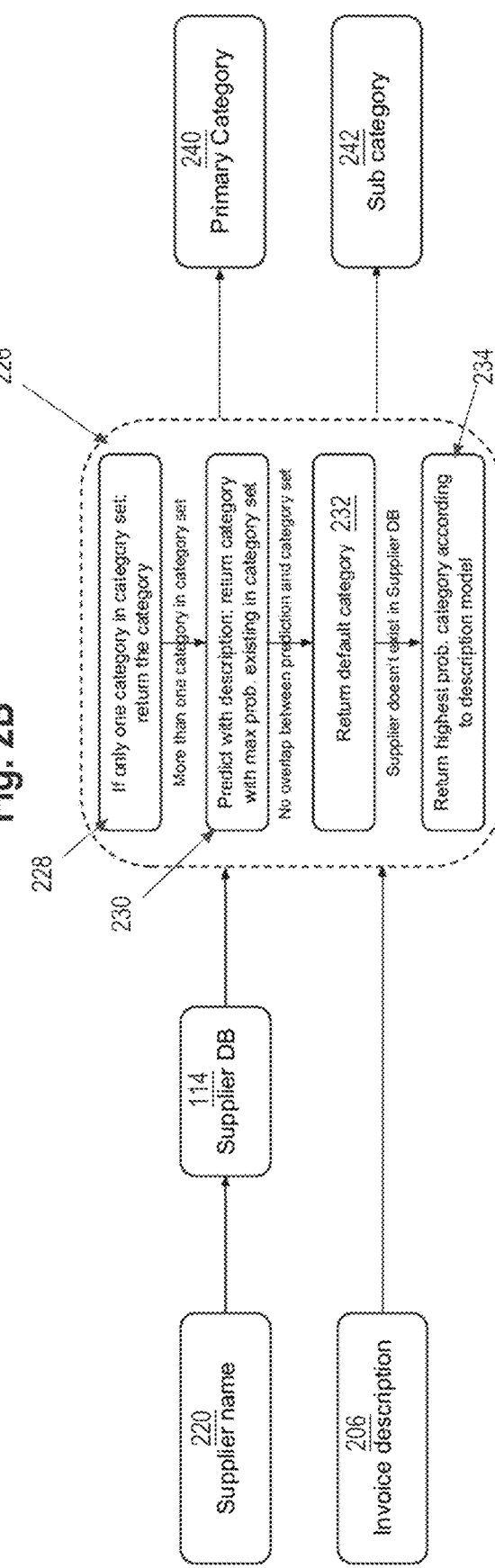
FIG. 2B is a data flow diagram showing details of a processing pipeline that can be used with the flow of FIG. 2A.

The supplier categorization instructions 134 comprise one or more digitally stored sequences of program instructions which, when executed using one or more processors of the application server computer 126, cause one or more processors to execute the processes of FIG. 2A, FIG. 2B, FIG. 3, as further described herein. Supplier categorization instructions 134 are programmatically coupled to or capable of transmitting and receiving requests and responses with the taxonomy database 110, invoice database 102, and supplier database 114. The supplier categorization instructions 134 also are programmed to request one or more of the trained machine learning models 136, 138 to evaluate specified input data and to receive output from the models that provides category values and prediction values or confidence level values.

2.2 Example Processes for Determining Supplier Category Values

FIG. 2A is a data flow diagram showing tiered machine learning processing of e-procurement records to result in efficient, accurate categorization of suppliers. FIG. 2A and each other flow diagram herein is intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the same functional level of illustration that is normally used at the high level of skill in this art to communicate the basis of developing working programs.

With the tiered approach of FIG. 2A, supplier classification is executed first with the goal of determining a prediction of the primary categories in which the supplier identified in a line item deals, without regard for transaction-level values. Thus, if a supplier is named in thousands of transactions, the process makes no attempt to inspect each transaction but instead seeks patterns in transactions based on a supplier name or supplier description field, as well as identifiers of commodities that a particular entity, such as a customer, has specified in past requisitions, purchase orders, or other documents.

In an embodiment, customer commodities data 202, supplier description data 204, and invoice descriptions 206 are evaluated using a first trained machine learning model (ML Model 1) and a second trained machine learning model (ML Model 2). Each of the ML Model 1 and ML Model 2 can be trained using a labeled training dataset on the order of 50,000 records of suppliers and can be used as initial records in the supplier database 114. Labeling can include more than one category per supplier.

In various embodiments, each of ML Model 1 and ML Model 2 can comprise an ensemble of a naïve Bayes classifier, a feature extraction vectorizer, a logistic regression model or linear classifier, or a transformer-based sentence extraction model such as the BERT model. At the time of this writing, an example of a naïve Bayes classifier is described online at: https://spark.apache.org/docs/2.0.0/api/python/pyspark.mllib.html#pyspark.mllib.classification.NaiveBayesModel. At the time of this writing, an example of a feature extraction vectorizer is described online at: https://scikit-learn.org/stable/modules/generated/sklearn.feature_extraction.text.TfidfVectorizer.html. At the time of this writing, an example of a logistic regression model is described online at: https://scikit-learn.org/stable/modules/generated/sklearn.linear_model.LogisticRegression.html. At the time of this writing, an example of a sentence transformer/BERT model is described online at: https://www.sbert.net/docs/package_reference/SentenceTransformer.html. These online references also include code libraries that can be used in an implementation.

The customer commodities data 202 can be obtained or accessed by executing queries against the taxonomy database 110, for a specific entity or for a community of entities; thus, the customer commodities data represents values from customer-specific taxonomies of commodities. The supplier description data 204 and invoice descriptions 206 can be obtained or accessed by executing queries against the current invoice database 102, for a specific entity or for a community of entities. The supplier description data 204 represents an identification of a supplier that appears in an invoice or other transaction document. The invoice descriptions 206 represent identifications of commodities, products, services, or other orders that appear in invoices or other transaction documents. Typically, customer commodities data 202 comprises multiple input signals, supplier description data 204 is a single input signal, and invoice descriptions 206 are multiple input signals.

After evaluation using ML Model 1 and ML Model 2, the machine learning models output predictions of a set of one or more primary categories 208 and a set of one or more subcategories 210; each prediction can comprise a category value and a confidence value representing a likelihood that the customer commodities data 202, supplier description data 204, and invoice descriptions 206 resolve to the specified category value. In this manner, the customer's own taxonomy as represented in taxonomy database 110 can act as an input signal to influence the assignment of canonical values or community-wide values for the primary categories or subcategories.

In an embodiment, a manual curation process 212 is executed for certain high-spend suppliers. In an embodiment, manual curation can comprise a human review of the predictions of the sets of one or more categories 208, 210 to verify that the highest predicted category values for the primary category and subcategory are correct. Process 212 can be justified on the grounds that an error for a high-spend supplier is likely to have significant cascading effects in other applications or systems.

If process 212 is used, then the sets of one or more primary categories 208 and subcategories 210 can be updated and stored as sets of one or more interim primary categories 214 and interim subcategories 216. Or, if process 212 is not used because the supplier description data 204 is not for a high-spend supplier, then the sets of one or more primary categories 208 and subcategories 210 can be copied to or used as sets of one or more interim primary categories 214 and interim subcategories 216. In either case, the sets of one or more interim primary categories 214 and interim subcategories 216 can be stored in a record of the supplier database 114 that identifies the supplier using a canonical label, and/or the supplier description data 204, with an association to the category values. In this manner, the process of FIG. 2A enables building, over time, an accurate supplier database 114 that identifies suppliers and categories of commodities in which those suppliers deal, with a high degree of confidence.

FIG. 2B is a data flow diagram showing details of a processing pipeline that can be used with the flow of FIG. 2A. In some embodiments, FIG. 2B is executed as a second stage of data processing after FIG. 2A. In an embodiment, a supplier name 220 is received as input, and can be a canonical name or the same supplier description data 204 as used in FIG. 2A. Supplier database 114 also acts as an input source. An invoice description 206 also is received as input and can be the same as the set of invoice descriptions of FIG. 2A. With these input signals, a hierarchical classification process 226 executes.

At block 228, the process is programmed to test whether the supplier name 220 is associated with commodities of only one category in the sets of one or more interim primary categories 214 and interim subcategories 216. If only one category is in each of the category sets, then no other classification processing is needed, and the process is programmed to return those single categories as a final primary category 240 and a final subcategory 242. Otherwise, when the sets of one or more interim primary categories 214 and interim subcategories 216 indicate that the supplier name 220 is dealing in more than one category, then control transfers to block 230 at which the process uses ML Model 1 and ML Model 2 to predict which single category in the sets of one or more interim primary categories 214 and interim subcategories 216 has the highest probability among all values in the sets. Both the supplier name 220 and invoice description 206 are used in these predictions. If the result of that machine learning evaluation is the same as the top value in the sets of one or more interim primary categories 214 and interim subcategories 216, then the top values are output as the final primary category 240 and the final subcategory 242.

If no overlap is present between the prediction and the category sets, then control transfers to block 232, at which the process is programmed to return a default category value for each of the final primary category 240 and the final subcategory 242. The default category value can correspond to a category value that has been assigned via the manual curation process 212 of FIG. 2A. A default category value can be stored in supplier database 114 in a record for each supplier. In effect, the logical flow at this point presumes that default category values in the supplier database 114 are more reliable than the output of the machine learning models. After execution of block 232, experimental implementations have shown that about 85% of suppliers will have been successfully and accurately categorized.

Furthermore, if the specified supplier does not exist in the supplier database 114, then at block 234, the process is programmed to return the category value having the highest probability value according to the description model. As a result, the process outputs a final primary category 240 and a final subcategory 242 with values having overall increased accuracy as compared to previous processes.

Throughout FIG. 2B and the description of process 226, the term "category" in the singular includes generating or using a primary category. Optionally, a subcategory can be included, but the main goal of FIG. 2B is to ensure that the primary category is highly accurate.

Embodiments have been found to significantly reduce the effort required for labeling training data. Embodiments provide better accuracy in the prediction of categories. The data processing pipeline of the disclosure ensures that the overall accuracy of predictions will increase continually with time, as the specified machine learning models process more suppliers, yet prioritizing high-spend suppliers ensures that a higher accuracy also is achieved in the initial implementation. In one test of the disclosure, the inventors selected and labeled about 400 randomly selected purchase orders and invoices from high-spend suppliers. This test dataset was processed using the approach specified in the Background of this disclosure, and using one of the disclosed embodiments. The accuracy in predicting the primary category increased to 80% from 40%, and subcategory prediction accuracy rose to 50% from 14%. Overall, primary category predictions and secondary category predictions were more acceptable even when incorrect because of the constraints on category prediction from the supplier database.

FIG. 3 illustrates an example process for determining a supplier category, in one embodiment. At block 302, a supplier name or supplier description is received as input. FIG. 3 can be executed in various embodiments, in real-time at the time that the buyer computer 122 enters a supplier name in a supplier name field of an application for purposes of retrieving other information about the supplier, or in an off-line process to generate and store category values in the supplier database 114. Thus, FIG. 3 can represent a microservice, function, or application that another application can invoke or call to generate a category value for a specified supplier name. Or FIG. 3 could be implemented as a standalone program to batch process many transaction records that identify suppliers, such as digitally stored invoices, requisitions, purchase orders, and the like.

At block 304, the process is programmed to transmit a query with the supplier name to a supplier database, such as the supplier database 114. The query is to retrieve a result set of records specifying whether the supplier name is in the database. If the supplier name is not in the database, as tested at block 308, then the process is programmed to evaluate the supplier name value and an invoice description value using a machine learning model to output a second set of one or more candidate categories with probability values. In this context, "second set" is merely an arbitrary label to differentiate the set described in this paragraph from another, similar set that is separately described later and does not imply that block 308 needs a first set also. At block 310, the process is programmed to select a candidate category having the highest probability value in the second set. That category value can be returned, at block 324, to a calling application; the return step also can comprise initiating a write or update operation to write or update a supplier record in the supplier database 114 to include the category value that was determined.

Referring again to block 306, if the supplier name is in the supplier database, then control passes to block 312 at which the process is programmed to retrieve the first set of one or more categories that are associated with the supplier name in the supplier database. For example, a response to the query of block 304 can include a supplier name record from the supplier database 114 having one or more column attributes specifying one or more values of a primary category for the associated supplier, and block 312 can comprise extracting or reading the one or more values of those column attributes.

At block 314, the process is programmed to test whether the first set obtained at block 312 has more than one category value. If not, then control transfers to block 315, and the process is programmed to return the single category value at block 324.

If the first set obtained at block 312 has more than one category value, then control transfers to block 308, and the process is programmed to evaluate the supplier name value and an invoice description value using a machine learning model to output a second set of one or more candidate categories with probability values. Control then transfers to block 316 at which the process is programmed to compare the first set to the second set. If the first set and second set do not overlap, then at block 320 the process is programmed to return a default category value at the return block 324. The default category value can be obtained from a column attribute value of the record as specified in block 312. Alternatively, if the first set and second set contain one or more common category values, then at block 322 the process is programmed to determine which category value to use, by returning the category value having the maximum probability value among all category values in the two sets.

2.3 Example Graphical User Interfaces and Applications

Figure 4A:
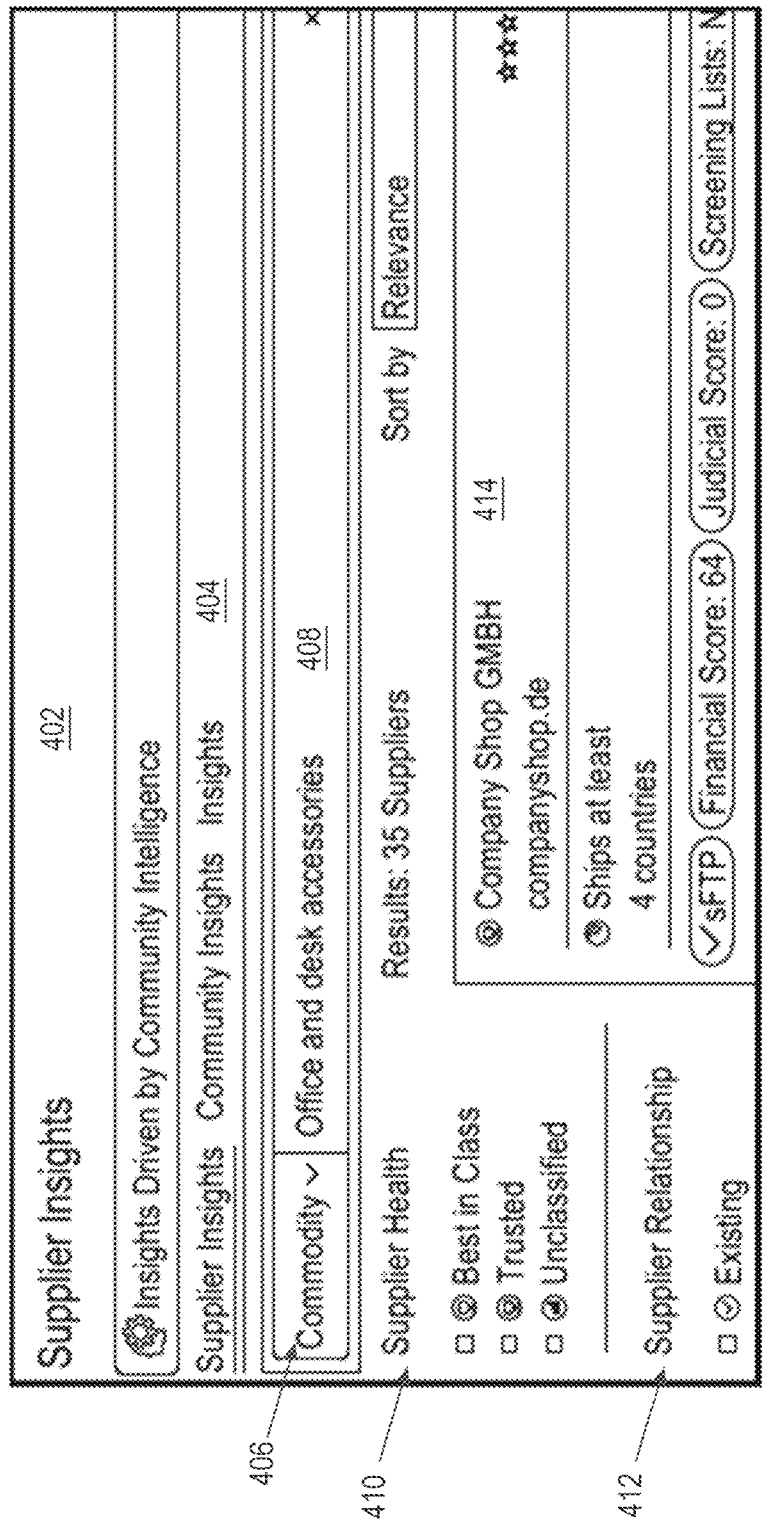
FIG. 4A illustrates an example graphical user interface for outputting supplier information based on a query specifying a commodity in which results are driven by supplier category values.

FIG. 4A illustrates an example graphical user interface for outputting supplier information based on a query specifying a commodity in which results are driven by supplier category values. The example of FIG. 4A shows a "Supplier Insights" graphical user interface 402, which could be generated based on data from supplier information application 132 and presentation instructions 128, to result in dynamic HTML that is rendered at buyer's computer 122. The GUI 402 can form part of an e-procurement system having an application, represented by supplier information application 132, that enables the buyer computer 122 to specify a commodity and receive information about suppliers in supplier database 114 that supply commodities in a relevant category, based on stored category values in supplier records in the supplier database.

The GUI 402 can comprise a link panel 404 having a plurality of active hyperlinks or selectable buttons. In the example of FIG. 4A, a "Supplier Insights" link has been selected to yield a display having the form of GUI 402. The GUI 402 can comprise a search type widget 406 programmed as a pull-down menu, and in the example, COMMODITY has been selected as a type of search. GUI 402 can have a search value field 408 comprising a structured list of values that correspond to the type of search specified using the search type widget 406. In the example, "Office and desk accessories" appears in search value field 408 and comprises a particular category value among a plurality of category values that are associated with supplier records in supplier database 114. In response to selecting a value for the search value field 408, GUI 402 can be programmed to initiate a query to supplier database 114, obtain a result set, and display a list of suppliers that are associated with category values matching the search value field 408. In the example, for clarity, one supplier is shown in a list 414 of GUI 402, but in other embodiments, a list of any number of suppliers could be provided.

The GUI 402 can provide other information from the supplier database 114 for the particular supplier that is shown in list 414. Examples include supplier health information 410, supplier relationship information 412, and various score values. In this manner, category values for suppliers, created using the processes of this disclosure, can support the practical application of querying and searching supplier data to obtain an efficient, matching list of suppliers that are known to have supplied commodities of the specified category.

Figure 4B:
FIG. 4B illustrates an example graphical user interface for outputting anonymized community spending data for a plurality of categories of suppliers.

FIG. 4B illustrates an example graphical user interface for outputting anonymized community spending data for a plurality of categories of suppliers. The example of FIG. 4B shows a "Commodity Insights" graphical user interface 420, which could be generated based on data from supplier information application 132 and presentation instructions 128, to result in dynamic HTML that is rendered at the buyer computer 122. The GUI 420 can form part of an e-procurement system having an application, represented by supplier information application 132, that enables the buyer computer 122 to specify filter values for transactions and receive charts or graphs of information about historic transaction documents with metrics based on categories of commodities represented in the transaction documents, with certain metrics being based on category values of suppliers in supplier database 114.

The GUI 420 can comprise a link panel 404 having a plurality of active hyperlinks or selectable buttons. In the example of FIG. 4A, a "Community Insights" link has been selected to yield a display having the form of GUI 420. The GUI 420 can comprise a filter panel 422 having a plurality of widgets that are programmed as drop-down menus with dynamic elements by which the buyer computer 122 can provide input to specify a type of activity, a type of transaction, an industry, and a period. In the example, the type of activity is SPEND, the type of transaction is REQUISITIONS, the industry is ALL, and the period is LAST 12 MONTHS. In response to the selection or updating of any of the widgets of the filter panel, the GUI 420 is programmed to transmit a POST request that is formatted to request data for a graph and provides the values of the widgets of the filter panel to the application server computer 126. In response, the supplier information application 132 is programmed to query the invoice database 102, query the supplier database 114, obtain result sets, join the result sets, and respond with data sufficient for the presentation instructions 128 to dynamically generate a visual graph or chart to transmit via HTTP server 130 to the buyer computer 122.

In the example of FIG. 4B, a bar chart has been generated having a horizontal axis with values corresponding to category values for categories in a global taxonomy and a vertical axis corresponding to a percentage of total spending as represented in past requisitions. The chart compares a percentage of buyer spend amount versus community spend amounts in various categories of a global taxonomy. The example illustrates that the category values of a global taxonomy, which can be determined via the processes of other aspects of the present disclosure, can be integrated into the practical application of digital data searching, querying, and formatting of search results, by including those category values in the horizontal axis and using the category values as a basis of search queries, counts, percentage calculations, and the rendering of a chart or graph as seen in FIG. 4B.

3. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body-mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
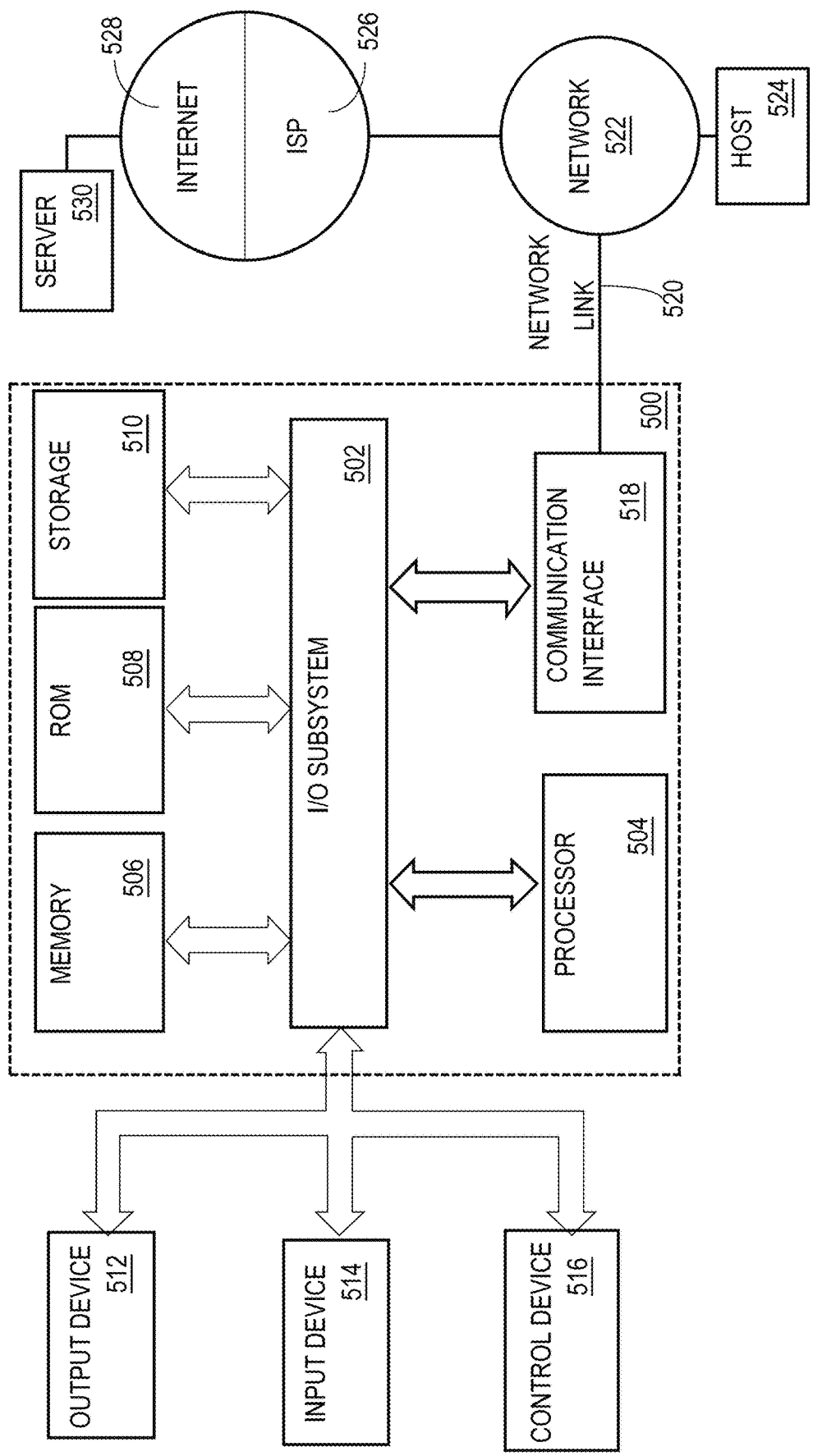
FIG. 5 illustrates a computer system with which one embodiment could be implemented.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or another dynamic storage device. Memory 506 also may be used for storing temporary variables or other intermediate information during the execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read-only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server, or web client. The instructions may be organized as a presentation layer, application layer, and data storage layer such as a relational database system using a structured query language (SQL) or no SQL, an object store, a graph database, a flat file system, or other data storage.

Computer system 500 may be coupled via I/O subsystem 502 to at least one output device 512. In one embodiment, output device 512 is a digital computer display. Examples of a display that may be used in various embodiments include a touchscreen display or a light-emitting diode (LED) display or a liquid crystal display (LCD) or an e-paper display. Computer system 500 may include other types of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism, or other types of a control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders, and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host computer 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that stores data and/or instructions that cause a machine to operate in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire, and fiber optics, including the wires that comprise a bus of I/O subsystem 502. Transmission media can also take the form of acoustic or light waves, such as those generated during radio-wave and infrared data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication network, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example, an Ethernet cable or a metal cable of any kind or a fiber-optic line or a telephone line. Network 522 broadly represents a local area network (LAN), wide-area network (WAN), campus network, internetwork, or any combination thereof. Communication interface 518 may comprise a LAN card to provide a data communication connection to a compatible LAN or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic, or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, a server farm, or other organizations of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer, and data storage layer such as a relational database system using a structured query language (SQL) or no SQL, an object store, a graph database, a flat file system, or other data storage.

Computer system 500 can send messages and receive data and instructions, including program code, through the network(s), network link 520, and communication interface 518. In the Internet example, server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method, comprising:
using an application server computer in a federated, multi-tenant e-procurement system having a plurality of hosted applications, receiving input comprising a supplier name or supplier description associated with a row in a supplier database, the row representing a digitally stored electronic invoice, the supplier database being a relational database;
using the application server, transmitting a query including the supplier name to a supplier database, receiving a result set from the supplier database, and determining from the result set whether the supplier name is in the supplier database;
in response to determining that the supplier name is in the supplier database, retrieving a first set of one or more categories that are associated with the supplier name in the supplier database, the first set of one or more categories having been assigned based on a customer commodities data of a taxonomy database;
first, in response to determining that the first set comprises one category value, populating a primary category attribute of the row using the one category value;
thereafter, in response to determining that the first set comprises more than one category, obtaining an invoice description value and evaluating the supplier name and the invoice description value using at least two trained machine learning models to output a prediction of a second set of two or more candidate categories with probability values specifying probabilities that each of the two or more candidate categories is correct, wherein the at least two trained machine learning models are trained on data comprising the smallest number of suppliers within the e-procurement system that represents at least 85% of total supplier volume of the e-procurement system;
selecting two particular candidate category values having the two highest probability values;
populating the primary category attribute and a secondary category attribute of the row using two particular candidate category values having the highest probability values; and
displaying, using a computer, a graphical user interface (GUI) comprising a plurality of active hyperlinks and selectable buttons, wherein the GUI is configured to generate a display of information representing supplier data and commodity data based on a selection of the plurality of active hyperlinks and selectable buttons.

2. The method of claim 1, each of the one or more trained machine learning models comprising any of: an ensemble of a naïve Bayes classifier, a feature extraction vectorizer, a logistic regression model or linear classifier; a transformer-based sentence extraction model.

3. The method of claim 1, further comprising:
comparing the first set to the second set; and
when the first set and the second set overlap, returning a category value having the maximum probability value among the first set and the second set as an output of a primary category.

4. The method of claim 3, further comprising, when the first set and the second set overlap, returning a first category value having the maximum probability value among the first set and the second set as an output of a primary category and returning a second category value having a second-highest probability value among the first set and the second set as an output of a secondary category.

5. The method of claim 3, further comprising, when the first set and the second set do not overlap, returning a default category value as the output of the primary category.

6. The method of claim 1, further comprising training the one or more trained machine learning models using a first dataset specifying customer commodities, a second dataset comprising supplier descriptions, and a third dataset specifying a set of invoice descriptions.

7. The method of claim 1, the first set of one or more categories and the second set of one or more candidate categories each specifying a UNSPSC category value.

8. The method of claim 1, the invoice description value being obtained from a free-form text field of the database.

9. The method of claim 1, the input comprising an invoice line item detail table that comprises invoice descriptions and supplier names corresponding to a plurality of invoice records for electronic invoices.

10. The method of claim 1, wherein receiving the input comprises a buyer computer entering a supplier name in a supplier name field of an application to retrieve other information about the supplier, the method further comprising invoking a micro-service or function programmed to execute the transmitting, determining, selecting, and populating.

11. The method of claim 1, wherein the first determining that the first set comprises one category value further comprises reading a default category value of the row.

12. One or more non-transitory computer-readable storage media storing one or more sequences of instructions which, when executed using one or more processors, cause the one or more processors to execute:
using an application server computer in a federated, multi-tenant e-procurement system having a plurality of hosted applications, receiving input comprising a supplier name or supplier description associated with a row in a supplier database, the row representing a digitally stored electronic invoice, the supplier database being a relational database;
using the application server, transmitting a query including the supplier name to a supplier database, receiving a result set from the supplier database, and determining from the result set whether the supplier name is in the supplier database;
in response to determining that the supplier name is in the supplier database, retrieving a first set of one or more categories that are associated with the supplier name in the supplier database, the first set of one or more categories having been assigned based on a customer commodities data of a taxonomy database;
first, in response to determining that the first set comprises one category value, populating a primary category attribute of the row using the one category value;
thereafter, in response to determining that the first set comprises more than one category,
obtaining an invoice description value and evaluating the supplier name and the invoice description value using at least two trained machine learning models to output a prediction of a second set of two or more candidate categories with probability values specifying probabilities that each of the two or more candidate categories is correct, wherein the at least two trained machine learning models are trained on data comprising the smallest number of suppliers within the e-procurement system that represents at least 85% of total supplier volume of the e-procurement system; selecting two particular candidate category values having the two highest probability values;
populating the primary category attribute and a secondary category attribute of the row using two particular candidate category values having the highest probability values; and
displaying, using a computer, a graphical user interface (GUI) comprising a plurality of active hyperlinks and selectable buttons, wherein the GUI is configured to generate a display of information representing supplier data and commodity data based on a selection of the plurality of active hyperlinks and selectable buttons.

13. The non-transitory computer-readable storage media of claim 12, each of the one or more trained machine learning models comprising any of: an ensemble of a naïve Bayes classifier, a feature extraction vectorizer, a logistic regression model or linear classifier; a transformer-based sentence extraction model.

14. The non-transitory computer-readable storage media of claim 12, further comprising sequences of instructions which, when executed using one or more processors, cause the one or more processors to execute:
comparing the first set to the second set; and
when the first set and the second set overlap, returning a category value having the maximum probability value among the first set and the second set as an output of a primary category.

15. The non-transitory computer-readable storage media of claim 14, further comprising sequences of instructions which, when executed using one or more processors, cause the one or more processors to execute, when the first set and the second set overlap, returning a first category value having the maximum probability value among the first set and the second set as an output of a primary category and returning a second category value having a second-highest probability value among the first set and the second set as an output of a secondary category.

16. The non-transitory computer-readable storage media of claim 14, further comprising sequences of instructions which, when executed using one or more processors, cause the one or more processors to execute, when the first set and the second set do not overlap, returning a default category value as the output of the primary category.

17. The non-transitory computer-readable storage media of claim 12, further comprising sequences of instructions which, when executed using one or more processors, cause the one or more processors to execute training the one or more trained machine learning models using a first dataset specifying customer commodities, a second dataset comprising supplier descriptions, and a third dataset specifying a set of invoice descriptions.

18. The non-transitory computer-readable storage media of claim 12, the first set of one or more categories and the second set of one or more candidate categories each specifying a UNSPSC category value.

19. The non-transitory computer-readable storage media of claim 12, the invoice description value being obtained from a free-form text field of the database.

20. The non-transitory computer-readable storage media of claim 12, the input comprising an invoice line item detail table that comprises invoice descriptions and supplier names corresponding to a plurality of invoice records for electronic invoices.

21. The non-transitory computer-readable storage media of claim 12, wherein the sequences of instructions for receiving the input further comprise sequences of instructions which, when executed using one or more processors, cause the one or more processors to execute a buyer computer entering a supplier name in a supplier name field of an application to retrieve other information about the supplier, the non-transitory computer-readable storage media further comprising sequences of instructions which, when executed using one or more processors, cause the one or more processors to execute invoking a micro-service or function programmed to execute the transmitting, determining, selecting, and populating.

22. The non-transitory computer-readable storage media of claim 12, wherein the instructions that cause the first determining that the first set comprises one category value further comprise sequences of instructions which, when executed using one or more processors, cause the one or more processors to execute reading a default category value of the row.

* * * * *